INVENTOR.
JOSEPH R. GATELY
BY
Alfred W. Barber
ATTORNEY

Feb. 2, 1971 — J. R. GATELY — 3,560,837
SHUNT REGULATED POWER SUPPLY WITH LIMITED
OVER-VOLTAGE AND SHORT-CIRCUIT CURRENT
Filed Sept. 20, 1968 — 3 Sheets-Sheet 2

INVENTOR.
JOSEPH R. GATELY
BY
*Alfred W. Barber*
ATTORNEY

United States Patent Office 3,560,837
Patented Feb. 2, 1971

3,560,837
SHUNT REGULATED POWER SUPPLY WITH LIMITED OVER-VOLTAGE AND SHORT-CIRCUIT CURRENT
Joseph R. Gately, Woodside, N.Y., assignor to Forbro Design Corp., New York, N.Y., a corporation of New York
Filed Sept. 20, 1968, Ser. No. 761,147
Int. Cl. H02m *1/18, 7/22*
U.S. Cl. 321—14         7 Claims

ABSTRACT OF THE DISCLOSURE

Shunt regulated power supplies are provided with low voltage drop in the unregulated supply and a small bleeder current to minimize over-voltage even on opening of the regulating circuit and low short-circuit current provided by flux-oscillating line regulating power transformer.

BACKGROUND OF THE INVENTION

(1) Field of the invention

The invention relates to regulated power supplies and, in particular, to shunt regulated power supplies with limited over-voltage and short-circuit current.

(2) Description of prior art

Shunt voltage regulators have been used in the past generally for use where more or less constant load conditions are to be supplied. However, these prior art regulators have been subject to two serious limitations. In one case, this limitation is that shunt regulators per se do not provide means for limiting short circuit current, and the other is that shunt regulators per se do not limit over-voltage as, for example, in the case of regulator failure.

SUMMARY

The present invention concerns shunt regulators primarily intended for constant voltage and constant load applications. In order to be able to use a Zener diode reference operating in the area of 6 volts, optimum for Zeners and at the same time provide output voltages substantially less than 6 volts, a bridge circuit reference is used. In order to provide current limiting on over-load or short-circuit without resorting to a series regulator, a current limiting (flux-oscillator) power transformer is used. And, in order to prevent over-voltage upon failure of the shunt regulator, a low voltage drop unregulated supply and filter circuit is used.

DESCRIPTION OF THE PREFERRED EMBODIMENTS

Figure 1:
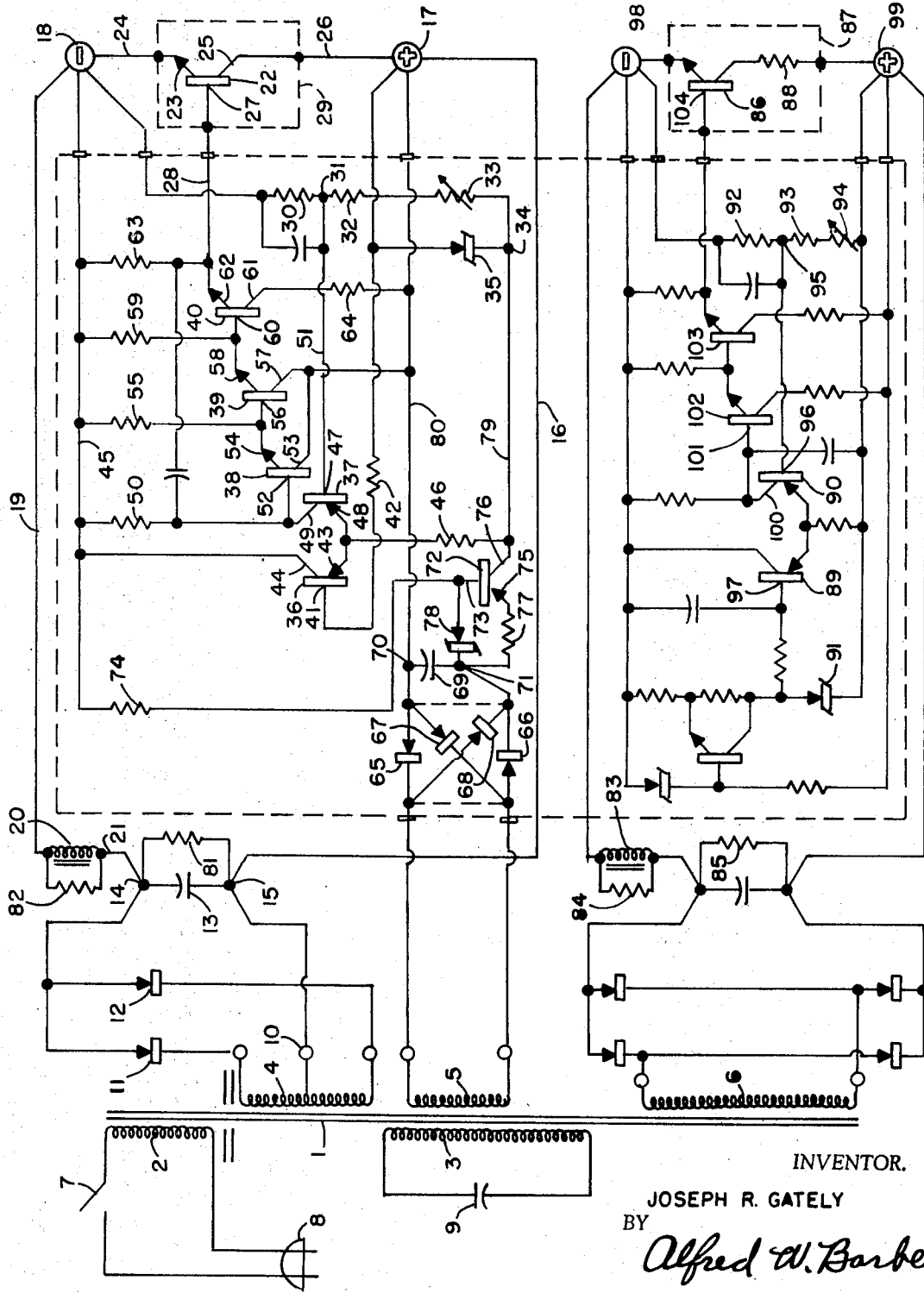
FIG. 1 is a schematic circuit diagram of one form of the present invention.

FIG. 1, the detailed schematic circuit diagram of one form of the present invention, shows a dual shunt regulated power supply with a single flux-ocillating power transformer. The power transformer includes a core 1, primary winding 2, resonant regulating winding 3, and secondary windings 4, 5 and 6. Primary 2 is connected through a switch 7 to a line plug 8. The resonant regulating winding is tuned by a suitable capacitor 9 so that the secondary voltages are regulated against line voltage changes. Secondary 4 is provided with a center tap 10 and rectifiers 11 and 12 are connected between secondary 4 and a large filter capacitor 13 so that full wave rectified direct current is provided between terminals 14 and 15. Output terminal 17 is connected over lead 16 to terminal 15 to provide one side (the positive in this case) of the output of the power supply. The second output terminal, terminal 18 is connected over lead 19, through inductor 20 and over lead 21 to terminal 14 to provide the other side of the output of the power supply. Connected across the two output terminals 17 and 18 is a shunt regulator comprising power transistor 22 including emitter 23 connected over lead 24 to terminal 18, collector 25 connected over lead 26 to terminal 17 and base 27 receiving control signals over lead 28. Power transistor 22 being called on to dissipate considerable amounts of power is generally provided with a suitable heat sink 29. Transistor 22 is controlled in such a manner as to regulate the voltage across terminals 17 and 18 keeping it constant as described in detail below.

FIG. 1 shows in detail the regulating circuit for driving regulating transistor 22 in such a manner as to maintain a constant output voltage across terminals 17 and 18. A four arm "bridge" circuit is formed including the output voltage between terminals 17 and 18 as the first arm of the bridge, a fixed voltage control resistor 30 connected between output terminal 18 and bridge terminal 31 as the second arm, a bridge current determining or reference resistor comprising fixed resistor 32 in series with adjustable resistor 33 connected between bridge terminals 31 and 34 and a source of reference voltage comprising Zener diode 35 connected between bridge terminal 34 and output terminal 17. If output terminal 17 is taken as the reference point, this bridge circuit is balanced so that the potential at terminal 31 is equal to the potential at terminal 17 when the ratio of the output voltage across terminals 17 and 18 to the resistance of resistor 30 is equal to the ratio of reference voltage provided by Zener 35 to the sum of resistors 32 and 33. This balance is maintained and, thus, the output voltage is regulated by connecting a high gain amplifier with differential input points, one connected to common terminal 17 and the other to null point 31 and output connection to base 27 in such a polarity as to have a degenerative action on the output voltage, that is, an action which tends to keep terminal 31 at the same potential as terminal 17. The amplifier includes transistors 36 and 37 connected as a differential pair and a cascaded series of current amplifying transistors including 38, 39 and 40. The number of transistors used in this cascaded series depends on the gain of the transistors and the degree of regulation required. Transistor 36 includes a base 41 returned through resistor 42 to terminal 17, emitter 43 is returned to a point which is positive with respect to terminal 17 as, for example, the positive side of reference voltage Zener 35 at terminal 34 and through emitter current determining resistor 46, and collector 44 is returned to terminal 18 over lead 45. The second transistor of the differential pair, namely transistor 37, includes a base 47 connected over lead 51 to bridge terminal 31, emitter 48 connected to emitter 43 and one end of emitter resistor 46 and collector 49 returned to the negative voltage source represented by terminal 18 through collector load resistor 50 and over lead 45. Between collector 49 and base 27 is connected a cascaded series of in-phase current amplifiers, the number of which depends on the total current gain required. As shown in FIG. 1 there are three cascaded stages comprising transistors 38, 39 and 40 each with the input connected to its base and its output taken from its emitter in the manner of a Darlington pair. Base 52 of transistor 38 is connected to collector 49, collector 53 is returned to positive terminal 17 and emitter 54 is returned to negative terminal 18 through resistor 55. Base 56 of transistor 39 is connected to emitter 54, collector 57 is returned to terminal 17 and emitter 58 is returned to negative terminal 18 through resistor 59. Base 60 of transistor 40 is connected to emitter 58, collector 61 is returned to terminal 17 through resistor 64 and emitter 62 is returned to terminal 18 through resistor 63. Emitter 62 is connected to base 27 over lead 28 completing the amplifier and driving circuit to regulator 22.

FIG. 1 shows additional provisions for the operation of the shunt regulating circuit including an auxiliary source of DC voltage for the reference voltage Zener 35 derived from secondary winding 5. This source of voltage includes suitable rectifying means comprising the bridge rectifier made up of rectifiers 65, 66, 67 and 68 connected between secondary 5 and filter capacitor 69 across the terminals 70 and 71 of which appears the direct current voltage for the reference voltage Zener 35. The direct current voltage across terminals 70 and 71 is applied through a constant current circuit comprising transistor 72 to Zener 35. Constant current transistor 72 includes a base 73 returned to the negative voltage of terminal 18 through base resistor 74, emitter 75 returned through resistor 77 to positive terminal 71 and collector 76 connected to Zener diode 35 over lead 79. Negative terminal 70 is connected to common terminal 17 over lead 80. Base 73 receives a predetermined bias equal to the Zener voltage of Zener diode 78 connected from base 73 to terminal 71. The constant current supplied by transistor 72 is equal to the Zener voltage of Zener diode 78 minus the emitter to base voltage of transistor 72 divided by the resistance of resistor 77. It is well known that the stability of a Zener diode is enhanced by supplying it with a constant current.

Figure 3:
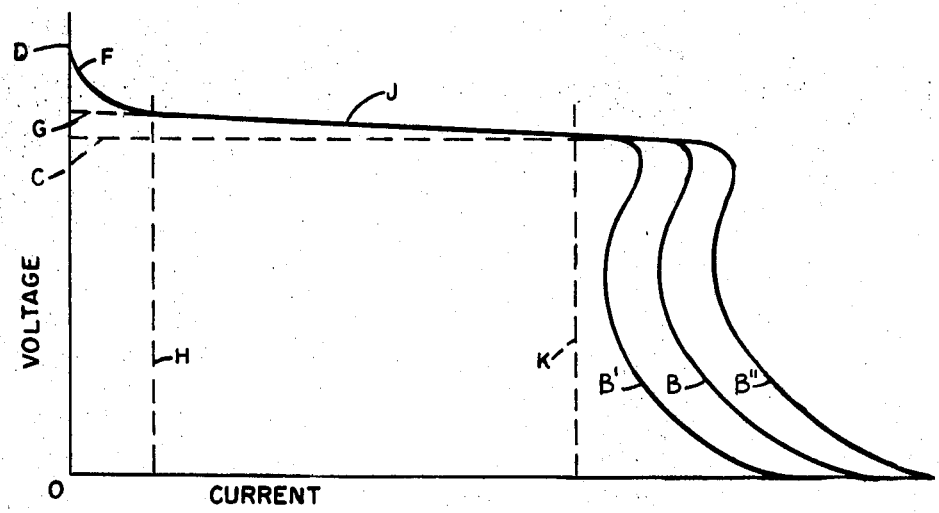
FIG. 3 is a graphical representation of the current limiting and over-voltage characteristics of the present invention.

FIG. 1 considered along with the curve of FIG. 3 will show the significance of bleeder resistor 81 connected across main filter capacitor 13 and the significance of low resistance filter choke 20 shunted by a very low resistance resistor 82. The curve F–J–B shows the characteristics of the output voltage vs. current of the power supply with the shunt regulator disconnected showing the characteristics of the power supply with regulation supplied by regulating transformer 1–2–4 including low resistance choke 20 shunted by resistor 82. If, neglecting for the moment the effect of bleeder 81 and choke 20, the shunt regulator is set to draw a regulating current K, in the event of failure of the shunt regulator in any manner as to remove the shunt current, the no load voltage will rise along curve J producing an overvoltage C to D across the output terminals. Now, if choke 20 has appreciable resistance, the voltage at K will be decreased by the IR drop in the choke and the voltage rise upon removal of current through the shunt regulator will be increased by this IR drop. On the other hand, if a bleeder current H is provided as by resistor 81, the rise along curve J will be only C to G upon removal of current through the shunt regulator. Thus, by providing a small percentage of bleeder current H, representing a relatively small percentage of current K, and by using a low resistance choke, the overvoltage, in case of failure which removes the shunt current through the shunt regulator, is reduced to less than half of what it would otherwise be. The portions of the curves at B', B, and B'' are the current limiting characteristics of the regulating transformer at low, normal and high line voltages respectively. Thus, the combination as shown provides current limiting in case of overload or short circuit and overvoltage protection in case of loss of shunt regulator current.

FIG. 1 includes a second power supply (lower portion of the figure) provided with alternating current input from the same power supply as the first supply described above (secondary 6). The basic circuitry is similar in the two supplies. The low voltage drop choke 83 shunted by damping resistor 84 and the preloading resistor 85 provide a very low over-voltage characteristic as described above. This supply is shunt regulated, power transistor 86 mounted on a heat sink 87 carries the regulating current. Resistor 88 in series with transistor 86 may be used to reduce the power dissipation in transistor 86. The balance of the circuit includes a differential amplifier employing transistors 89 and 90. This amplifier compares the voltage across a reference voltage source, provided by Zener 91, with a portion of the output voltage obtained at point 95 of the voltage divider made up of resistors 92, 93 and 94 bridged across output terminals 98 and 99. The voltage across reference voltage Zener 91 is applied to base 97 of transistor 89 while the portion of the output voltage appearing at point 95 is applied to base 96 of transistor 90. The amplified error voltage at collector 100 is applied to base 101 of transistor 102. Transistor 102 and 103 are emitter coupled current amplifiers driving base 104 of regulator transistor 86.

Figure 2:
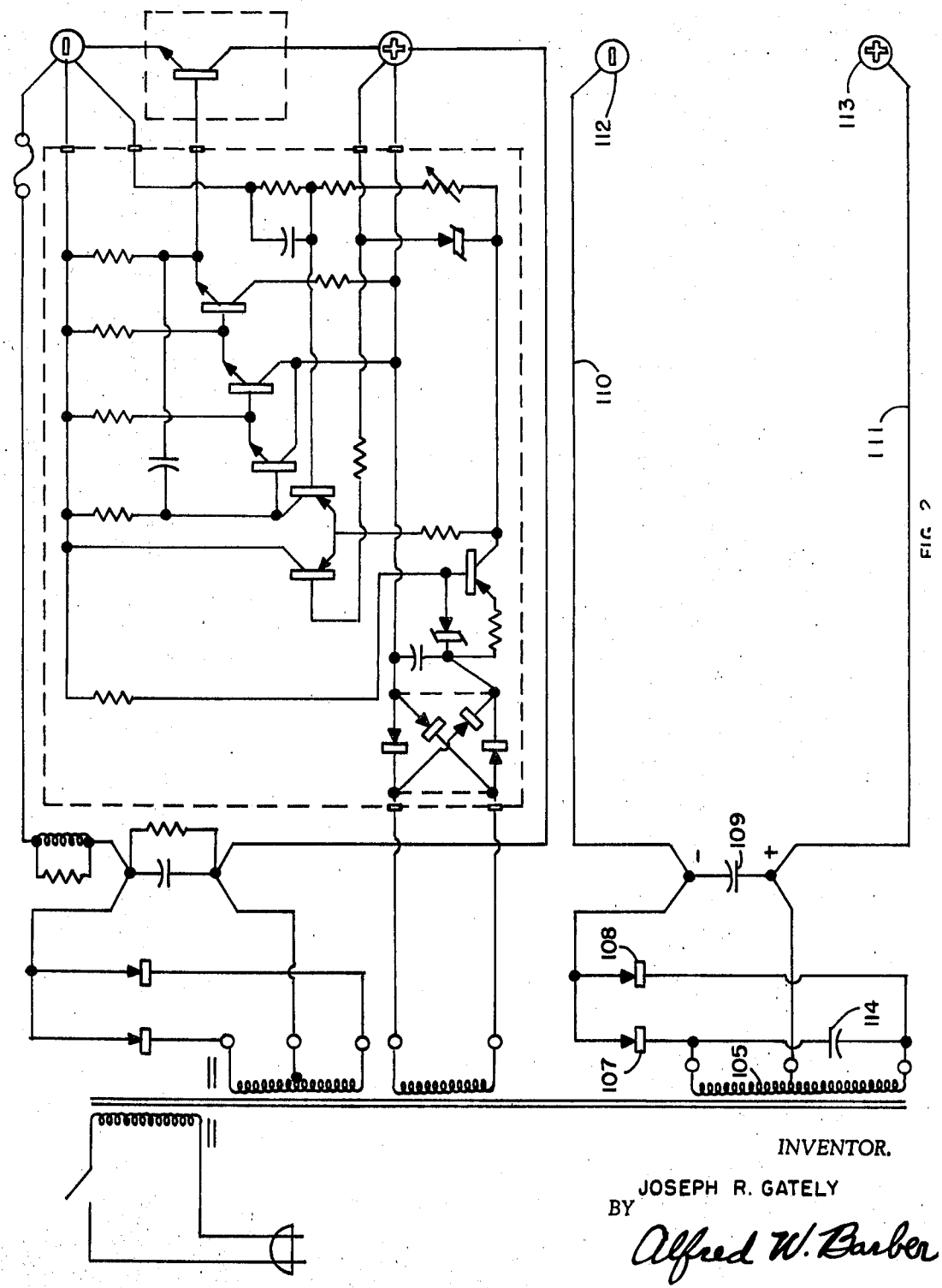
FIG. 2 is a schematic circuit diagram of a second form of the present invention.

FIG. 2 is a modified form of the present invention, in which a power supply shown in the upper portion of the figure and employing substantially the same circuit as that shown in the upper portion of FIG. 1, is combined with a ferroresonant transformer regulated power supply shown in the lower portion of FIG. 2. The ferroresonant transformer regulated power supply receives alternating current from winding 105 which is rectified by rectifiers 107 and 108 and charging filter capacitor 109. The output direct current is taken off across capacitor 109 and applied to output terminals 112 and 113 by leads 110 and 111 respectively. This second power supply uses winding 105 for the source of alternating current and winding 105 also serves as the resonant winding of the flux-oscillating transformer being tuned by resonating capacitor 114.

While only a few forms of the present invention have been shown and described, many modifications will be apparent to those skilled in the art and within the spirit and scope of the invention as set forth, in particular, in the appended claims.

I claim:

1. In a regulated power supply, the combination of:
a line regulating flux-oscillator power transformer;
rectifying and filtering means including a capacitor for providing direct current connected to said transformer;
preloading resistive means connected across said capacitor for partially stabilizing the direct current voltage across said capacitor;
a pair of output terminals connected through a low resistance choke to said capacitor;
shunt regulating means including a transistor connected in shunt with said terminals;
a source of reference voltage;
an amplifier for comparing the voltage across said terminals with said reference voltage and controlling said transistor in a sense to maintain said voltage across said terminals equal to said reference voltage;
whereby the voltage across said terminals in the absence of current through said transistor is limited to a predetermined increment above said controlled voltage.

2. A regulated power supply as set forth in claim 1; wherein said reference voltage comprises the voltage drop across a resistor, said resistor being connected in series with a second resistor and a fixed voltage source provided by the voltage drop across a Zener diode supplied with a substantially constant current.

3. A regulated power supply as set forth in claim 1; and including a second similar power supply connected to said transformer.

4. A regulated power supply as set forth in claim 1; and including an unregulated power supply comprising rectifying means and a filter capacitor connected to said transformer.

5. A regulated power supply as set forth in claim 1; and including a resistor connected in series with said transistor for limiting the current through said transistor.

6. A regulated power supply as set forth in claim 1;

and including means for adjusting said reference voltage.

7. A regulating power supply as set forth in claim 1; and including a resistor connected across said choke.

References Cited

UNITED STATES PATENTS

| 3,324,378 | 6/1967 | Kupferberg et al. | 321—18 |
| 3,334,241 | 8/1967 | Ussery | 321—18X |
| 3,336,524 | 8/1967 | Healey | 323—22(SCR) |
| 3,353,080 | 11/1967 | Santelmann, Jr. | 323—22(T)X |
| 3,356,901 | 12/1967 | Kramer et al. | 317—20 |
| 3,356,927 | 12/1967 | Barron | 321—18 |
| 3,409,822 | 12/1968 | Wanlass | 321—18 |
| 3,461,374 | 8/1969 | Rhyne, Jr. | 321—18 |

J D MILLER, Primary Examiner

G. GOLDBERG, Assistant Examiner

U.S. Cl. X.R.

307—34, 35; 317—33; 321—18; 323—9, 22, 40